United States Patent
Chen

(10) Patent No.: US 6,813,095 B2
(45) Date of Patent: Nov. 2, 2004

(54) OPTICAL IMAGE PICK-UP LENS

(75) Inventor: Tzu-Kan Chen, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 37 days.

(21) Appl. No.: 10/390,780

(22) Filed: Mar. 19, 2003

(65) Prior Publication Data

US 2004/0184162 A1 Sep. 23, 2004

(51) Int. Cl.$^7$ .............................................. G02B 13/18
(52) U.S. Cl. ........................... 359/717; 369/112.23
(58) Field of Search ............................... 359/708, 717; 369/112.01, 112.05, 112.23, 112.24, 112.25

(56) References Cited

U.S. PATENT DOCUMENTS

| | | | | |
|---|---|---|---|---|
| 5,067,803 A | * | 11/1991 | Ohno | 359/708 |
| 5,166,830 A | * | 11/1992 | Ishibai et al. | 359/717 |
| 5,600,493 A | * | 2/1997 | Katsuma | 359/717 |
| 5,619,380 A | * | 4/1997 | Ogasawara et al. | 359/661 |
| 5,627,684 A | * | 5/1997 | Lewis | 359/717 |
| 5,666,234 A | * | 9/1997 | Ohno | 359/794 |
| 5,677,798 A | * | 10/1997 | Hirano et al. | 359/717 |
| 5,892,984 A | * | 4/1999 | Koike | 396/6 |
| 6,097,551 A | * | 8/2000 | Kreitzer | 359/793 |
| 6,335,835 B1 | * | 1/2002 | Koike | 359/717 |
| 6,449,105 B1 | * | 9/2002 | Dou | 359/793 |
| 2003/0169362 A1 | * | 9/2003 | Saito | 348/335 |

* cited by examiner

*Primary Examiner*—Georgia Epps
*Assistant Examiner*—Darryl J. Collins
(74) *Attorney, Agent, or Firm*—Troxell Law Office PLLC

(57) ABSTRACT

An optical image pick-up lens is formed from crescent-shaped first and second lenses that may be aspherical molded glass lenses or aspherical plastic lenses. A convex surface at a first side of the first lens faces toward an object, and a convex surface at a second side of the second lens faces toward a formed image. The lens enables reduced lens length and high resolution by satisfying the following relational expressions: $0.4f \leq d < 0.9f$; $0.5f \leq |R3| \leq 100f$; and $0.01 < |f2|/|f1| < 0.9$; where, f is an overall focal length of the lens; d is a distance from the first side of the first lens to the second side of the second lens; R3 is a radius of curvature of an object side of the second lens; f1 is a focal length of the first lens; and f2 is a focal length of the second lens.

5 Claims, 5 Drawing Sheets

OPTICAL IMAGE PICK-UP LENS

FIELD OF THE INVENTION

The present invention relates to an optical image pick-up lens, and more particularly to a high performance and low cost optical lens having decreased number of lenses suitable for conventional cameras and cameras using CCD (charge-coupled device) or CMOS (complementary metal-oxide semiconductor) as a sensing element thereof.

BACKGROUND OF THE INVENTION

With the advancement in scientific technologies, most newly developed electronic products not only have light and compact structure but also provide a variety of functions. For example, image pick-up devices are included not only in digital still cameras, PC (personal computer) cameras, and network cameras, but also in mobile phones, personal digital assistant (PDA), etc. The image pick-up devices require not only good image forming ability but also compact volume and low cost to enable convenient carry of electronic products using the image pick-up devices and to effectively widen the applications of such image pick-up devices.

As an image pick-up device, conventional spherical ground glass lenses have been widely adopted in optical industry field because there is a wide range of materials available for making such lenses and the color aberration thereof can be more easily corrected. However, the spherical ground glass lenses have the disadvantages of uneasy correction of spherical aberration and astigmatic aberration when they are used in cases having a smaller F number and wide angle of field. To improve the above-mentioned drawbacks existed in the conventional spherical ground glass lenses, there have been developed image pick-up devices using aspherical plastic lenses or aspherical molded glass lenses to obtain better image quality, such as the lenses disclosed in U.S. Pat. No. 6,031,670 entitled "Wide-angle Lens" and Japanese Patent No. P2001-183578A entitled "Image Pick-up Lens". However, the optical image pick-up lenses disclosed in the above-mentioned US and Japanese patents have a length that is still very long. For example, in the lens combination disclosed in Japanese Patent No. P2001-183578A, the distance d from the first side of the first lens to the second side of the second lens is larger than or equal to 0.9f (that is, d>0.9f, where, f is an overall length of the focal lengths of the whole lens combination), preventing the image pick-up lens from having an even smaller volume or lower cost to meet the requirement of light and compact design for all electronic products. The conventional image pick-up lenses therefore have limited applications.

SUMMARY OF THE INVENTION

It is a primary object of the present invention to provide an optical image pick-up lens that provides high resolution and has effectively reduced overall lens length, so that the image pick-up lens has smaller volume and lower cost to increase its applications.

To achieve the above and other objects, the optical image pick-up lens of the present invention includes a lens combination consisting of two aspherical molded glass lenses or two aspherical plastic lenses. Both the first and the second lens in the lens combination have at least one of two sides being an aspherical surface. The first lens is a meniscus-shaped lens having a convex surface at a first side or object side thereof, and the second lens is also a meniscus-shaped lens having a convex surface at a second side or image side thereof. And, the lens combination satisfies the following relational expressions:

$$0.4f \leq d < 0.9f;$$

$$0.5f \leq |R3| \leq 100f;\ \text{and}$$

$$0.01 < |f2|/|f1| < 0.9;$$

where, f is an overall length of the focal lengths of the whole lens combination; d is a distance from the first side of the first lens to the second side of the second lens; R3 is a radius of curvature of an object side of the second lens; f1 is the focal length of the first lens; and f2 is the focal length of the second lens.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
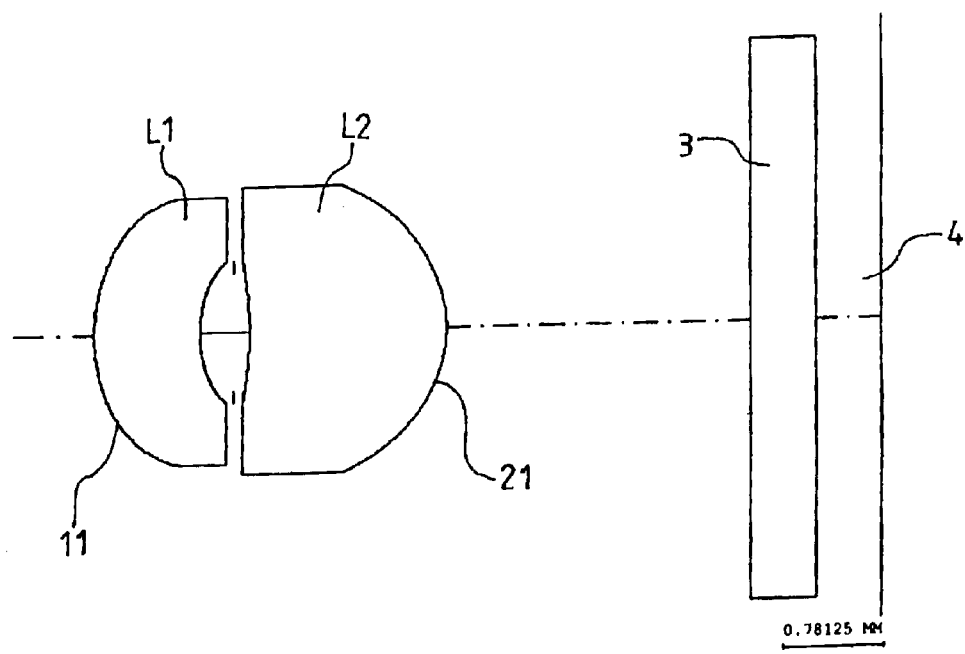
FIG. 1 is a schematic plan view showing an optical structure of the present invention.

Please refer to FIG. 1 that is a schematic plan view showing the structure of an optical image pick-up lens according to the present invention. As shown, the lens of the present invention mainly includes a first lens L1 and a second lens L2, so that light beams pass the first and the second lens L1, L2 and then pass a CCD cover glass 3 to form an image on a light-sensitive surface 4. The first lens L1 has two opposite sides, at least one of which is an aspherical surface, and the second lens L2 also has two opposite sides, at least one of which is an aspherical surface. Moreover, the first lens L1 is a meniscus-shaped lens with the first side, which is a convex surface 11, facing toward an object side of the lens. The second lens L2 is also a meniscus-shaped lens with the second side, which is a convex surface 21, facing toward an image-forming side. The first and the second lens L1, L2 together form a lens combination that satisfies the following relational expressions:

$$0.4f \leq d < 0.9f \tag{1}$$

$$0.5f \leq |R3| \leq 100f \tag{2}$$

$$0.01 < |f2|/|f1| < 0.9 \tag{3}$$

where, f is an overall length of the focal lengths of the whole lens combination; d is a distance from the convex surface at the first side 11 of the first lens L1 to the convex surface at the second side 21 of the second lens L2; R3 is a radius of curvature of the object side of the second lens L2; f1 is the focal length of the first lens L1; and f2 is the focal length of the second lens L2. Moreover, both the first and the second lenses L1, L2 may be made of aspherical plastic lenses or aspherical molded glass lenses.

It has been a common requirement for the optical image puck-up lens to be high quality, low-cost, short, and light to meet the basic requirements of light and compact structure for most of the up-to-date technological products. The following explains why the present invention meets the above-mentioned requirements for electronic products.

[1] When the optical image pick-up lens of the present invention satisfies the relational expression:

$$0.4f \leq d < 0.9f \quad (1)$$

the overall length d of the lens is smaller than 0.9 times of the overall focal length of the lens f, and is therefore closer to the requirements of light and compact structure as compared to the lens disclosed in Japanese Patent No. P2001-183578A. In the event of having a "d" smaller than 0.4f (i.e. d<0.4f), the first and the second lens L1, L2 must have a reduced thickness and a shortened distance between them. This condition would result in difficulties in correcting astigmatic aberrations, such as spherical aberration and coma aberration, of the formed image and therefore difficulties in obtaining good image quality.

[II] When the optical image pick-up lens of the present invention satisfies the relational expression:

$$0.5f \leq |R3| \leq 100f \quad (2)$$

it would be easier to manufacture the second lens L2 and correct aberrations thereof. In the event the value of |R3| is smaller than 0.5f (i.e. |R3|<0.5f), the convex surface at the second side 21 of the second lens L2 would have a smaller radius of curvature |R4| that results in difficulties in the fabrication of the lens. And, in the event the value of |R3| is larger than or equal to 100f (i.e. |R3|≥100f), it would be more difficult to correct the aberration of the lens.

[III] The relational expression of $0.01 < |f2|/|f1| < 0.9 \ldots (3)$ determines a refractive power of the first and the second lens L1, L2. When a value of |f2|/|f1| is smaller than 0.01 (i.e. |f2|/|f1|<0.01), the second lens L2 is required to have a refractive power that is so large that difficulties in manufacturing the lens exist. And, when the value of |f2|/|f1| is larger than 0.9 (i.e. |f2|/|f1|>0.9), the first lens L1 is required to have a refractive power that is so large that difficulties in aberration correction exist.

The present invention will now be described in more details by illustrating two embodiments thereof as below.

<First Embodiment>

Figure 2:
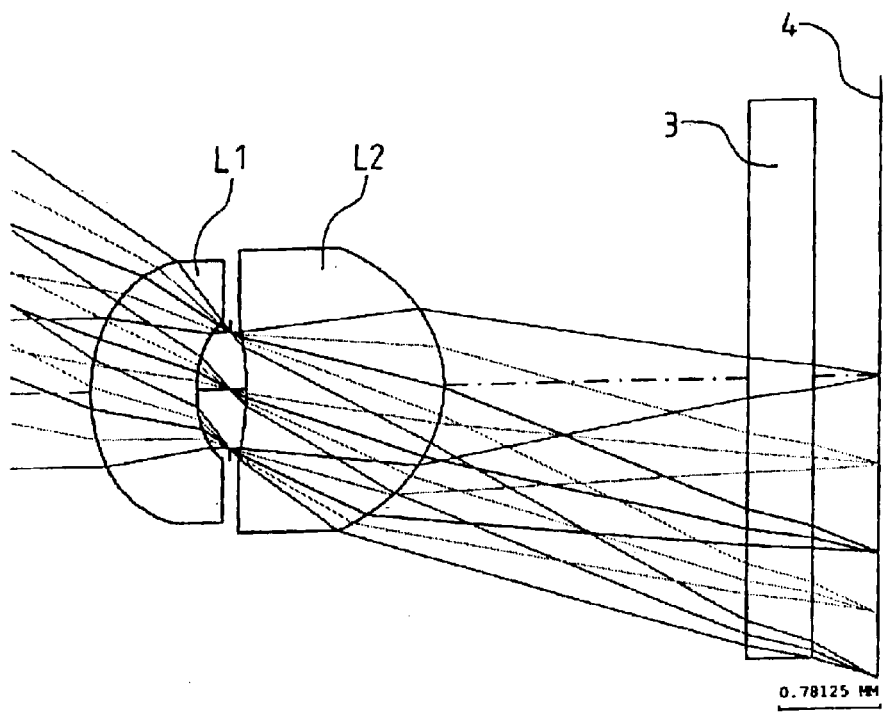
FIG. 2 is a schematic view showing optical paths in a first embodiment of the present invention.
Figure 3:
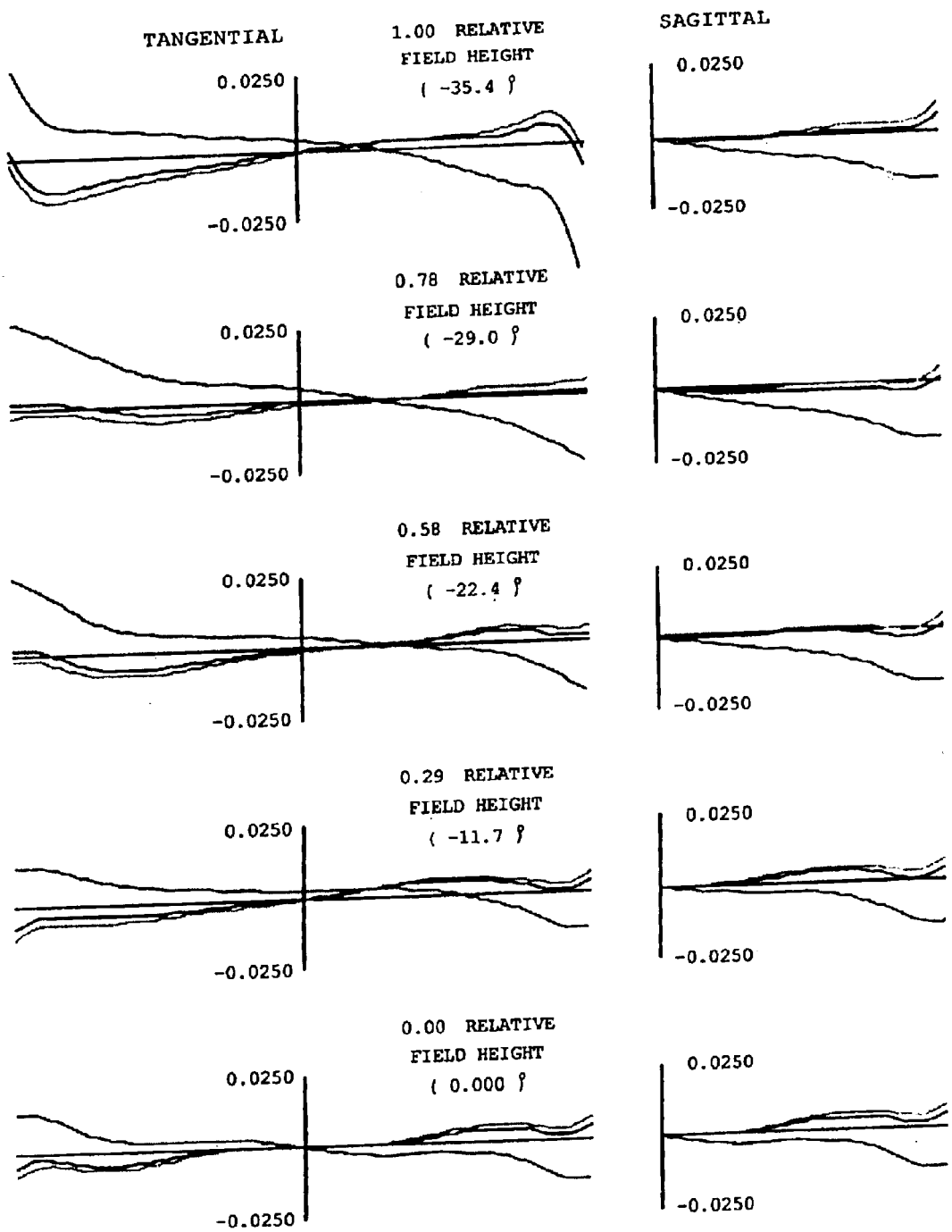
FIG. 3 shows aberration curves at different positions of an image picked up and formed with an optical lens according to the first embodiment of the present invention.
Figure 4:
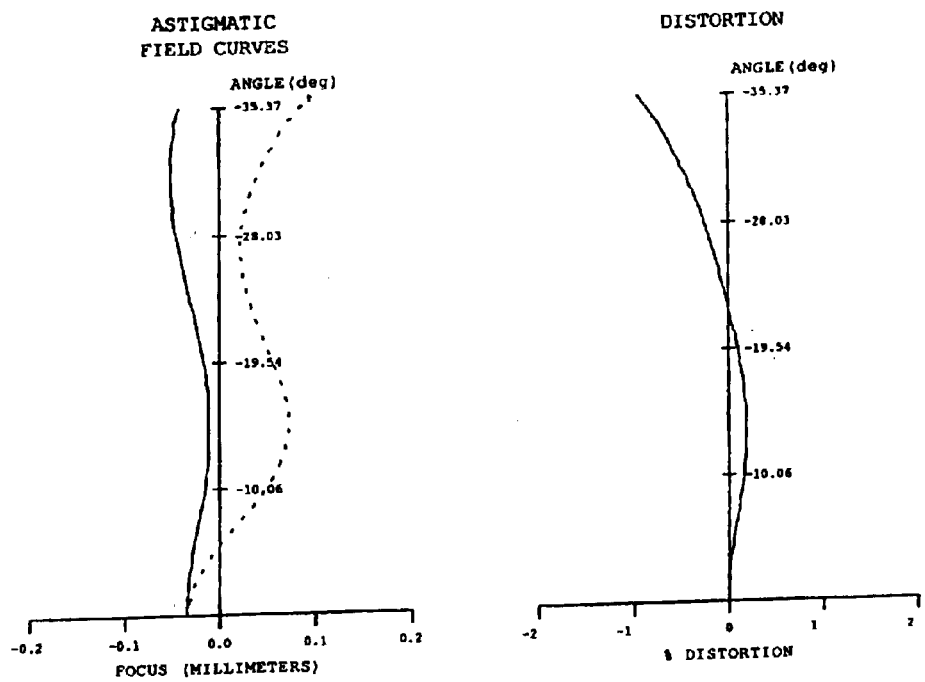
FIG. 4 is a graph showing curves of distortion and astigmatic aberrations of image picked up and formed with the lens according to the first embodiment of the present invention.

Please refer to FIGS. 2, 3 and 4 that are sequentially a plan view showing optical paths in a lens, a schematic view showing aberration curves at different positions of an image, and a schematic view showing curves of distortion and astigmatic aberrations of an image obtained from this first embodiment of the present invention. The following table lists various parameters for the optical image pick-up lens according to this first embodiment:

|  | Radius of Curvature | Thickness | Refractive Index of Lens Material |
|---|---|---|---|
| Object (OBJ) | ∞ | ∞ |  |
| 1: 1st Side of L1 | 1.42888 | 0.800000 | Nd=1.583; Vd=30 |
| 2: 2nd Side of L1 | 1.06418 | 0.258407 |  |
| Iris (STO) | ∞ | 0.113172 |  |
| 4: 1st Side of L2 | −3.05437 | 1.5 | Nd=1.491; Vd=57.8 |
| 5: 2nd Side of L2 | −1.01521 | 2.311178 |  |
| 6: 1st Side of CCD cover glass | ∞ | 0.500000 | BK7 |
| 7: 2nd Side of CCD cover glass | ∞ | 0.500000 |  |
| Image (IMG) | ∞ | 0.000000 |  |

The following is a table listing different aspherical coefficients for the lens of the first embodiment of the present invention:

|  | S1 1st Side of L1 | S2 2nd Side of L1 | S4 1st Side of L2 | S5 2nd side of L2 |
|---|---|---|---|---|
| K | 0.989835 | 2.652753 | 0 | −1.991559 |
| A | 0.130777E−03 | 0.706296E−01 | −.132464E+0 | −.174528E+00 |
| B | 0.469131E−01 | −.751200E+00 | 0.315963E+0 | −.395452E−01 |
| C | −.595449E−01 | 0.315965E+01 | −.281043E−01 | 0.548341E−01 |
| D | 0.318246E−01 | −.780125E+01 | 0.747579E+0 | −.570755E−01 |

And, $Z = ch^2/\{1+[1-(1+K)c^2h^2]^{1/2}\} + Ah^4 + Bh^6 + Ch^8 + Dh^{10}$ is a Conic and Aspherical Surface Formula for the lens of the first embodiment of the present invention, where, c is the radius of curvature, h is the height of lens, K is the conic constant, A is the $4^{th}$ order aspherical coefficient, B is the $6^{th}$ order aspherical coefficient, C is the $8^{th}$ order aspherical coefficient, and D is the $10^{th}$ order aspherical coefficient. In the above first embodiment of the present invention, the first lens L1 is made of a polycarbonate (PC) plastic material, and the second lens L2 is made of a 2-methacrylic acid resin (PMMA) material.

When the focal length f of the lens combination is 3.24 mm, and the distance d between the convex surface 11 at the $1^{st}$ side of the first lens L1 and the convex surface 21 at the $2^{nd}$ side of the second lens L2 of the lens combination is 2.67 mm, the relational expression (1) of 0.4f≤d<0.9f is satisfied. And, when the second lens L2 has a radius of curvature R3=−3.05437 at an object side, the relational expression (2) of 0.5f≤|R3|≤100f is satisfied. And, when the first lens L1 has a focal length f1=−37.5 mm and the second lens L2 has a focal length f2=2.5 mm, the value of |f2|/|f1| is 0.067 to satisfy the relational expression (3) of 0.01<|f2|/|f1|<0.9.

<Second Embodiment>

Figure 5:
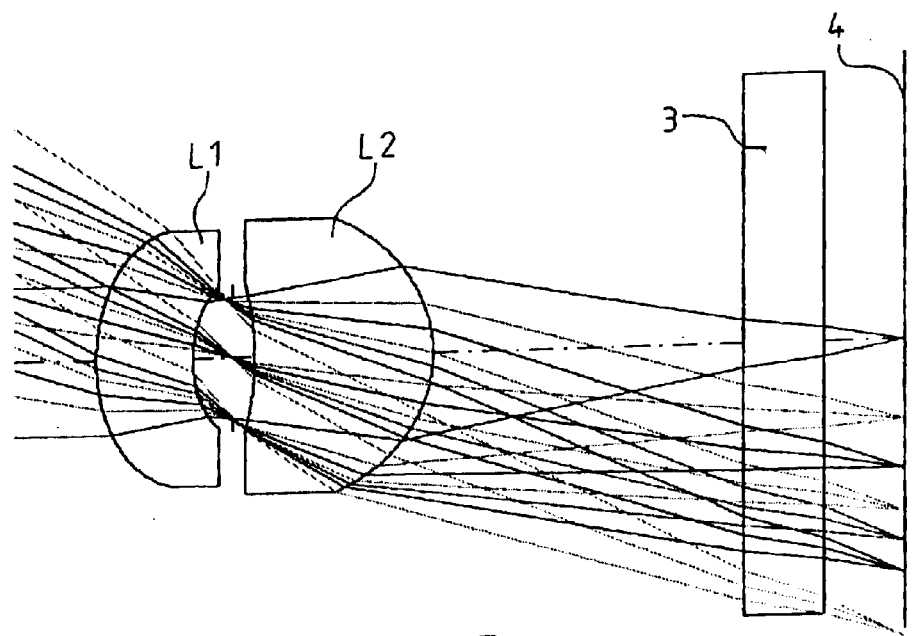
FIG. 5 is a schematic view showing optical paths in a second embodiment of the present invention.
Figure 6:
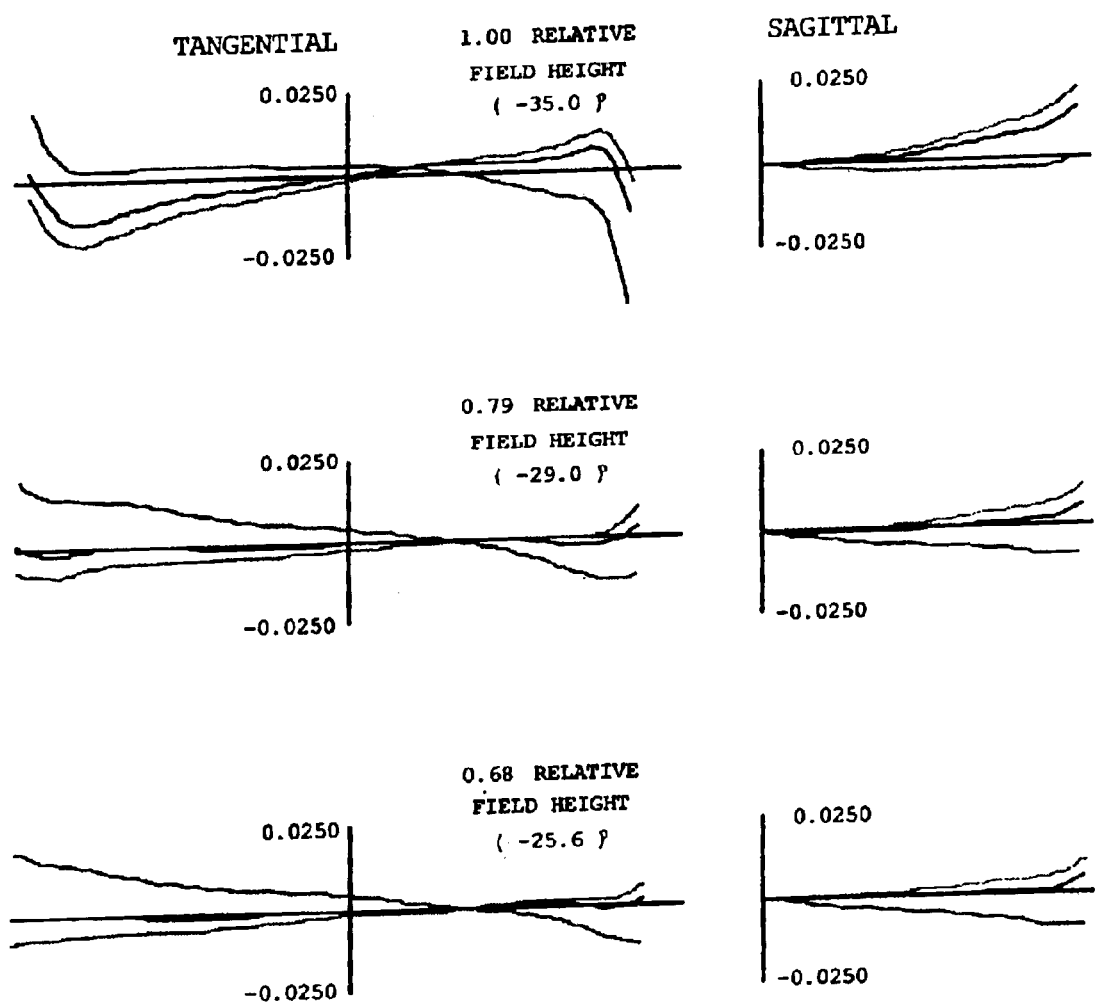
FIG. 6 shows aberration curves at different positions of an image picked up and formed with the optical lens according to the second embodiment of the present invention.
Figure 7:
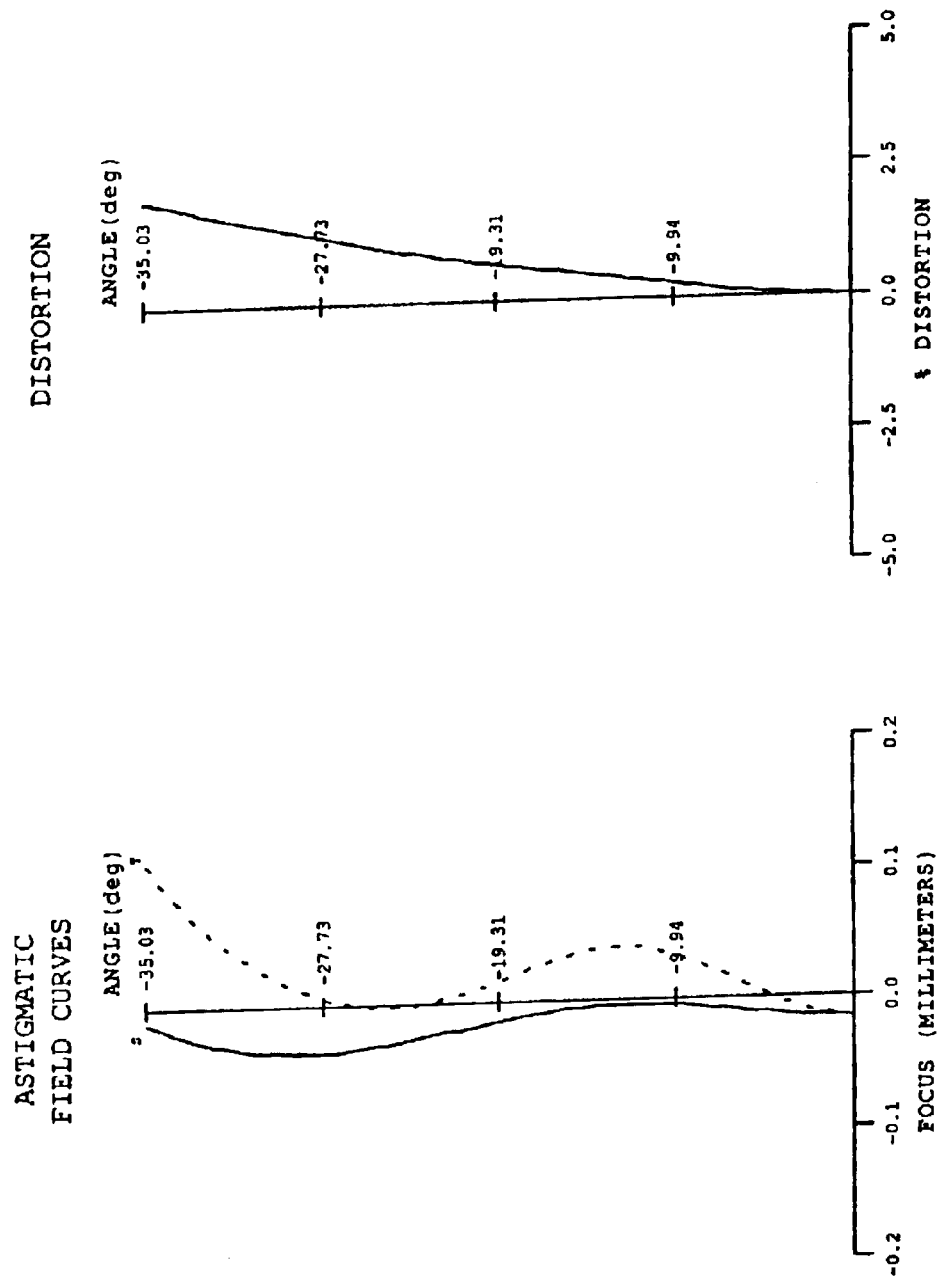
FIG. 7 is a graph showing curves of distortion and astigmatic aberrations of image picked up and formed with the lens according to the second embodiment of the present invention.

Please refer to FIGS. 5, 6, and 7 that are sequentially a plan view showing optical paths in a lens, a schematic view showing aberration curves at different positions of an image, and a schematic view showing curves of distortion and astigmatic aberrations of an image obtained from this second embodiment of the present invention. The following table lists various parameters for the optical image pick-up lens according to this second embodiment:

|  | Radius of Curvature | Thickness | Refractive Index of Lens Material |
|---|---|---|---|
| Object (OBJ) | ∞ | ∞ |  |
| 1: 1st Side of L1 | 1.54589 | 0.750000 | Nd=1.583; Vd=30 |
| 2: 2nd Side of L1 | 1.09497 | 0.307272 |  |
| Iris (STO) | ∞ | 0.166290 |  |

-continued

|  | Radius of Curvature | Thickness | Refractive Index of Lens Material |
|---|---|---|---|
| 4: 1st Side of L2 | −2.38316 | 1.375000 | Nd=1.51633; Vd=64.1 |
| 5: 2nd Side of L2 | −0.99183 | 2.396941 |  |
| 6: 1st Side of CCD cover glass | ∞ | 0.625000 | BK7 |
| 7: 2nd Side of CCD cover glass | ∞ | 0.625000 |  |
| Image (IMG) | ∞ | 0.000000 |  |

The following is a table listing different aspherical coefficients for the lens of the second embodiment of the present invention:

|  | S1 1st Side of L1 | S2 2nd Side of L1 | S4 1st Side of L2 | S5 2nd side of L2 |
|---|---|---|---|---|
| K | 1.38759 | 2.842662 | 0 | −2.640205 |
| A | 0.2922E−01 | 0.114030E+0 | −.119044E+0 | −.275025E+0 |
| B | 0.2354E−01 | −.5272025E+0 | 0.239381E+0 | 0.729738E−01 |
| C | −.35834E−01 | 0.28131E+01 | −.327872E+0 | −.355038E−01 |
| D | 0.323150E−01 | −.69866E+01 | 0.120281E+1 | −.260056E−01 |

And, $Z = ch^2/\{1+[1-(1+K)c^2h^2]^{1/2}\} + Ah^4 + Bh^6 + Ch^8 + Dh^{10}$ is a Conic and Aspherical Surface Formula for the lens of the second embodiment of the present invention. In the above second embodiment of the present invention, the first lens L1 is made of a polycarbonate (PC) plastic material, and the second lens L2 is made of a BK7 glass material.

When the focal length f of the lens combination is 3.2 mm, and the distance d between the convex surface 11 at the $1^{st}$ side of the first lens L1 and the convex surface 21 at the $2^{nd}$ side of the second lens L2 of the lens combination is 2.6 mm, the relational expression (1) of $0.4f \leq d < 0.9f$ is satisfied. And, when the second lens L2 has a radius of curvature R3=−2.38316 at the object side, the relational expression (2) of $0.5f \leq |R3| \leq 100f$ is satisfied. And, when the first lens L1 has a focal length f1=−16.6 mm and the second lens L2 has a focal length f2=2.46 mm, the value of $|f2|/|f1|$ is 0.148 to satisfy the relational expression (3) of $0.01 < |f2|/|f1| < 0.9$.

What is claimed is:

1. An optical image pick-up lens, comprising a first lens and a second lens, both of which are meniscus-shaped lenses; said first lens having two sides, at least one of which being an aspherical surface, and said second lens also having two sides, at least one of which being an aspherical surface; a convex surface at a first or object side of said meniscus-shaped first lens facing toward an object, and a convex surface at a second or image side of said meniscus-shaped second lens facing toward a formed image; and a lens combination of said first and said second lens satisfies the following relational expressions:

$$0.4f \leq d < 0.9f;$$

$$0.5f \leq |R3| \leq 100f; \text{ and}$$

$$0.01 < |f2|/|f1| < 0.9;$$

where, f is an overall focal length of said lens combination; d is a distance from said first side of said first lens to said second side of said second lens; R3 is a radius of curvature of an object side of said second lens; f1 is a focal length of said first lens; and f2 is a focal length of said second lens.

2. The optical image pick-up lens as claimed in claim 1, wherein said first lens comprises an aspherical plastic lens.

3. The optical image pick-up lens as claimed in claim 1, wherein said first lens comprises an aspherical molded glass lens.

4. The optical image pick-up lens as claimed in claim 1, wherein said second lens comprises an aspherical plastic lens.

5. The optical image pick-up lens as claimed in claim 1, wherein said second lens comprises an aspherical molded glass lens.

* * * * *